United States Patent [19]

Hardin et al.

[11] Patent Number: 5,696,760
[45] Date of Patent: Dec. 9, 1997

[54] TEMPORARY EQUIPMENT INDENTIFIER MESSAGE RESPONSE CONTROL METHOD

[75] Inventors: Carl Thomas Hardin, Encinitas; James E. Petranovich, Encinitas, both of Calif.; Kumar Balachandran, Cary, N.C.; Andrew Wright, Vancouver, Canada

[73] Assignee: Cirrus Logic, Inc., Fremont, Calif.

[21] Appl. No.: 534,792

[22] Filed: Sep. 27, 1995

[51] Int. Cl.[6] .............................. H04J 3/14; H04M 11/00
[52] U.S. Cl. ........................ 370/252; 370/230; 370/236; 379/59
[58] Field of Search .................... 379/59, 58, 62, 379/56, 107, 40, 34, 63, 60, 57; 455/33.1, 34.1, 56.1, 33.2, 33.4, 54.1; 370/17, 252, 229, 230, 236; 380/23

[56] References Cited

U.S. PATENT DOCUMENTS

| | | | |
|---|---|---|---|
| 5,454,024 | 9/1995 | Lebowitz | 379/40 |
| 5,457,680 | 10/1995 | Kamm et al. | 370/332 |
| 5,537,395 | 7/1996 | Alles et al. | 370/236 |
| 5,537,474 | 7/1996 | Brown et al. | 380/23 |
| 5,579,374 | 11/1996 | Doi et al. | 379/59 |

*Primary Examiner*—Wellington Chin
*Assistant Examiner*—Melissa Kay Carman
*Attorney, Agent, or Firm*—Robert G. Lev; David L. Stewart; J. P. Violette

[57] ABSTRACT

Competition between subscriber stations attempting to access reverse channels in response to Temporary Equipment Identifier (TEI) messages is limited by requiring the subscriber stations to wait for a predetermined amount of time. The time delay is selected on the basis of a random number and a factor based upon the number of TEI messages broadcast. The method for determining response opportunities for subscriber stations also includes a back-off phase at the first stage. The time delays to the defer phase is based upon a random period of time and a predetermined maximum based upon the time needed for the microslots containing a TEI message.

2 Claims, 7 Drawing Sheets

TEMPORARY EQUIPMENT INDENTIFIER MESSAGE RESPONSE CONTROL METHOD

TECHNICAL FIELD

This invention relates generally to wireless communication devices. More particularly, the invention relates to controlling response traffic of wireless subscriber stations to limit power consumption and avoid collisions.

BACKGROUND OF THE INVENTION

The modern analog cellular system for mobile wireless duplex voice transmission called "Advanced Mobile Phone Service" (AMPS), uses the FCC assigned carrier frequency range of 800 to 900 MHz. Automobile-mounted cellular units transmit voice signals to a cellular base station within a given cell at up to one watt of power. Battery powered, hand-held cellular units transmit voice signals to a cellular base station within a given cell using up to one quarter watt of transmission power.

The analog human voice was the signal that the AMPS system was first designed to communicate. AMPS was optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of base stations, with a user's signal handed off to the next cell site as he or she moves outside the current cell area. This cellular hand-off can cause a temporary loss in transmission or reception. Whereas, temporarily losing a voice signal is not critical because a user knows when there is a signal loss and the voice information can be retransmitted, signal loss, even if temporary, poses special problems for digital data transmission. Other sources of loss in voice signal transmission are drops in signal strength, reflections, Rayleigh fading, and cellular dead spots.

The availability of portable computers naturally led to the desire to conduct wireless transmission of digital data from a remote location. Presently, the AMPS voice cellular system is being used to transmit digital data in the form of circuit-switched cellular data across AMPS carrier channels. Raw (baseband) digital data must be converted so that it can be transmitted and received across the analog AMPS system. One disadvantage of the AMPS system for data transmission is that narrow channel bandwidth and transmission errors limit the baud rate for transmitting and receiving digital data. Again, loss of raw digital data may also be caused by other sources in the AMPS mobile cellular system.

Efficient wireless communication of both voice and data signals in an integrated package accordingly has been difficult. Furthermore, it has been difficult to integrate AMPS voice transmission features with applications such as data transmission, electronic mail and duplex paging, as well as enable provisions of a circuit-switched cellular data interface such as a wireless fax-modem, into a single hand-held battery operated wireless unit. This has been accomplished in part by the systems disclosed in the common assignee's U.S. Pat. No. 5,544,222, using a Cellular Digital Packet Data (CDPD) system described in the CDPD specification, Version 1.1, incorporated herein by reference as background material. The CDPD communication system shares the same carrier frequencies assigned to the AMPS channels as described in Part 405, Version 1.1 of the CDPD specification (the CDPD specification is incorporated herein by reference).

The typical base unit or mobile data base station (MDBS 1, as illustrated in FIG. 1 herein), of a CDPD system utilizes a channel within an AMPS cell to establish a link and communicate to a user's wireless subscriber station. The MDBS may use other frequencies outside of AMPS that are made available to it by service providers. The wireless subscriber station (M-ES 2) is a portable computer, hand-set or other portable electronic device containing a subscriber communication station. The MDBS serves as a communications link between the user of the wireless subscriber station M-ES 2 and a service provider's network of wire lines, microwave links, satellite links, AMPS cellular links, or other CDPD links (such as mobile data intermediate system MD-IS 3 and intermediate systems 4, 5, 6) to convey data to another wireless subscriber station, computer network, or non-mobile or fixed end-user system (F-ES 7, 8).

The CDPD network is designed to operate as an extension of existing communication networks, such as AMPS networks and the Internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually based on the destination address carried in the packet and knowledge of current network topology. The packetized nature of the data transmissions from an M-ES 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion of the CDPD network consists of a set of cells. A cell is defined by the geographical boundaries within the RF transmission range from a fixed transmission site such as MDBS 1, which can be received at acceptable levels of signal strength by mobile subscribers such as M-ES 2. The transmitter supporting the cell may be located centrally within the cell, with transmission being carried out via an omni-directional antenna, or the transmitter located at the edge of a cell and transmitted via a directional antenna to cover only a portion of the cell, referred to as a sector. In typical configurations, the transmitters for several sectors are co-located. The area served by a set of cells has some area overlap so that a roaming wireless subscriber station can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process, called cell transfer, is done independently of normal AMPS hand-off procedures.

In FIG. 1, the interface (A) between the wireless subscriber station 2 and the MDBS 1 is an "air interface" constituted by a radio frequency link using standard AMPS frequencies. The MDBS 1 is connected to other mobile data base stations through a mobile data intermediate system (MD-IS) 3. A number of mobile data base stations can be under the control of a single mobile data intermediate system. The mobile data intermediate systems are connected to each other through intermediate systems such as 4 and 5 in FIG. 1.

The intermediate systems are constituted by at least one node connected to more than one sub-network (such as intermediate system MD-IS 3). The intermediate system has a primary role of forwarding data from one subnetwork to another. The mobile data MD-IS 3 performs data packet routing based on knowledge of the current location of each wireless subscriber station within the range of the mobile data base stations under the control of the MD-IS. The MD-IS is the only network entity that is "aware" of the location of any of the wireless subscriber stations. However, under some circumstances (as defined by the CDPD specification, Version 1.1), particular mobile data base stations will keep track of behavior of specific wireless subscriber stations. A CDPD-specific Mobile Network Location Protocol (FLNLP) is operated between each MD-IS (through the intermediate system) to exchange location information regarding the wireless subscriber stations.

The overall CDPD network is controlled by a network management system (NMS) 10 having an interface with at least one mobile data intermediate system 3. Using a special protocol, programming instructions can be transmitted from the NMS 10 through the MD-IS 3 to any number of mobile data base stations under proper conditions.

Such programming instructions can be used to convey useful network data to the MDBS, as well as configure the operation of an MDBS with respect to such critical features as maintaining channel queues. The NMS also controls other CDPD system characteristics such as the timing of paging messages to coincide with non-dormant periods of the M-ES hand-sets. One advantage of CDPD is the capability of providing operating instructions to mobile data base stations from the NMS 10 through an MD-IS 3, or by a direct connection to the MDBS as outlined in the description of MDBS architecture found in the CDPD specification, Version 1.1, Parts 402 and 403.

FIG. 2 depicts a comparison between the CDPD network of FIG. 1 and a standard AMPS network. The MDBS 1 is the CDPD equivalent of an AMPS base station 21. Both serve as links to mobile users, 2, 2', and 2" for the CDPD system and 22, 22' and 22" for AMPS users. Both AMPS and CDPD functions can be handled by the same hand-set or end system equipment. Also, the MDBS 1 is preferably located with the AMPS base station 21 as explained in greater detail later.

The MD-IS 3, which acts as a local controller for the CDPD mobile data base stations connected to it, is generally equivalent to the mobile telephone switch office (MTSO) 23 used to control a plurality of AMPS base stations 21, 21' and 21". In the AMPS system, the MTSO 23 can be connected to the various base stations 21, 21', 21" by way of communication links, either over dedicated landlines or through a Public Switched Telephone Network (PSTN). Likewise, the connection between MD-IS 3 and the various mobile data base stations 1, 1', 1" controlled thereby is made in the same manner. However, different signaling protocols are used than those found in the AMPS system.

In comparison to AMPS, the infra-structure requirements of CDPD are very small. CDPD base station equipment is preferably located at a cellular carrier's cell site with existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF equipment if both are co-located. By contrast, the MTSO of the AMPS system and the MD-IS of the CDPD system do not have to be co-located in order to share RF links. In the AMPS system, the MTSO 23 has the responsibility of connecting the AMPS base station and the mobile station to another party through a PSTN 24. The intermediate system 4 of the CDPD corresponds to the use of the PSTN by the AMPS system. Like the AMPS system, the CDPD system must also use the public switch telephone network or another landline network for completing calls to remote parties or systems via a phone system terminal network 28. However, the CDPD system employs a different protocol than that used by the AMPS system for completing calls over a PSTN.

The MDBS maintains a number (up to the MDBS transmission capability) of channel streams across the airlink interface, as directed by the MD-IS controlling that MDBS. The MDBS instructs all wireless subscriber stations to change channels when necessary such as when an AMPS communication is detected on the CDPD channel. Each wireless subscriber station's terminal stream is carried on one channel stream at a time, normally selected by the mobile subscriber, preferably based upon data received from the MDBS regarding optimum channels for CDPD use. The forward and reverse traffic in a given cell (the terminal stream of the MDBS) is carried on a single DS0 trunk, between the MDBS and the MD-IS. Communication between the MDBS and the MD-IS over the DS0 trunk follows standard formats such as T1.

Within the CDPD network, digital data is transmitted between the MDBS and the M-ES using Gaussian Minimum Shift Keying (GMSK) modulation. Transmissions from the base station to the wireless subscriber station M-ES are continuous. Those from wireless subscriber station M-ES to the MDBS use a burst mode in which wireless subscriber station M-ES accesses a channel only when it has data to send and the channel is not being used by other mobile wireless subscriber stations. This allows multiple mobile wireless subscriber stations to share a single channel, and for data transmission characterized by intermittent transactions of relatively small amounts of data, greatly reducing the connection time compared to that when sending digital data over conventional circuit-switched cellular modems.

Unlike the signaling schemes used in conventional cellular modems, which have been chosen based on the need to operate within the constraints of the existing voice signaling system, the GMSK modulation technique used for CDPD communication was explicitly selected with the intent of obtaining both very high bit transmission rates and good error performance in cellular channels. The fact that the choice of modulation was not constrained by a pre-existing signal structure allows CDPD systems to achieve substantially greater instantaneous bit rates at very low received signal levels when compared to those of conventional cellular modems. This means that CDPD communication systems will provide reliable, high speed data transmission in many areas where signal quality is inadequate for good cellular modem performance. Presently, the raw (baseband) digital data being transferred across CDPD include electronic mail messages, digital fax data, or other digital data representing a network connection such that files may be transferred as if currently connected to a local area network.

The mobile data intermediate system MD-IS 3 handles the routing of packets for all visiting wireless subscriber stations in its serving area. Two services are performed by the MD-IS: a registration service maintaining an information base of each M-ES currently registered in a particular serving location; and a readdress service, decapsulating forwarded packets and routing them to the correct cell. The serving MD-IS also administers authentication, authorization and accounting services for the network support service applications.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and detect the onset of voice traffic on the channel currently being used for CDPD communication. If an AMPS cellular unit begins transmitting on a channel occupied by a CDPD communication, the CDPD unit ceases transmitting on that channel and switches to another available channel (a process called "channel hopping") or if no other channel is available, ceases transmission until a channel becomes available for CDPD use.

Although the CDPD system shares existing AMPS radio frequency channels, AMPS calls are given first priority, and they are always able to preempt the use of any channel being used by CDPD. However, the cellular service provider may opt to dedicate one or more channels to CDPD usage. In this case, AMPS calls will never attempt to pre-empt the channels dedicated to CDPD use.

In normal operation, the MDBS will carry out channel hopping to avoid channels to be used for AMPS communications. To do this, the MDBS performs a monitor activity on AMPS channels, and maintains a list of the status (occupied by voice or unused) for each channel available for CDPD use at the cell. The MDBS selects a channel for CDPD use from the unused channels in the list based on a combination of criteria (not specified in the CDPD standard). These could include such considerations as the likelihood that the channel will be required by the voice system in the near future, the amount of interference present on the channel, the amount of interference that the CDPD communication is likely to cause to other voice users in different cells, or on other sectors, and other factors. The MDBS transmits a list of all channels available for CDPD use (whether currently occupied by a voice communication or not) to the wireless subscriber stations. The MDBS may execute a channel hop before the channel is pre-empted by AMPS communication if the MDBS determines that another channel is more suitable. In such a case, the MDBS sends a message to the wireless subscriber stations commanding them to change to the specific channel selected, and then the MDBS executes the hop. This sort of hop is much more orderly and efficient than an unplanned hop since the wireless subscriber stations do not have to search for the next channel.

If the present CDPD channel is pre-empted by AMPS communication, the MDBS selects another channel from those unused by AMPS communications and immediately hops to it without informing the wireless subscriber station (an unplanned hop). The wireless subscriber station then determines that the CDPD signal is no longer present on the current channel and searches the other channels in the list to determine the channel (if any) to which the CDPD communication has hopped.

The CDPD system has the capability of easily interfacing with the existing AMPS system and sharing some front-end equipment with it. To take advantage of this capability, the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside the MDBS normally shared with the AMPS system. This external equipment found in the AMPS base station includes an antenna system, RF power amplifiers (in particular, linear amplifiers which can be shared with existing AMPS), RF multicouplers, power splitters, duplexers, and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

FIG. 3 is a block diagram of a portable communication terminal handset 100. In most respects, this portable communication terminal is similar to conventional portable radio telephone handsets having a radio frequency module 102 with at least one radio frequency transceiver. The radio frequency transceiver uses a main antenna 104 for both receiving and transmitting the various types of signals handled by the portable terminal, such as AMPS data (circuit switched cellular data) communication, AMPS voice communication and CDPD communication. A diversity antenna 106 is used as a backup to maintain reception under certain adverse conditions. A telephone type handset 112 is used to facilitate AMPS voice communication.

The portable terminal can also be patched into a local public switch telephone network (PSTN) by way of a digital-analog access interface (DAA) connected to the radio control processor 108. This processor, along with control processor and modem 109, shares the various control functions of the portable terminal including call setup, high level protocol, low level protocol, power adjustment, modem operation and data transfer with an external host computer. To facilitate ease of subscriber use, the host computer can be a personal computer (PC) or personal digital assistant (PDA) or other electronic device. The connection hardware of the portable terminal is of a standard type normally used with PC external connectors.

The portable data terminal handset and wireless subscriber station depicted in FIG. 3 can be configured to permit all the modes of operation illustrated in FIG. 4 and described in patent application Ser. No. 08/117,913. (abandoned on Dec. 18, 1996). The mode designated as 200 in FIG. 4 represents the menu mode selection by either the operator or programmer of the portable data terminal handset. Either of two modes (AMPS or CDPD) can be selected by an operator using a key pad on the handset. If data is being entered into the portable terminal (handset) 100 by a host computer, either the selected mode or a predetermined default setting can be selected as part of that data transfer.

Preferably, the system is normally in a low-power sleep mode. This sleep or dormant mode results in minimum power expenditure. Normally, the sleep mode will be interrupted every 10–255 seconds to check for messages such as incoming paging signals. If none are received, the CDPD mode remains idle. The CDPD can be rendered active as indicated by receipt of a paging signal, or a command from the host computer or handset user to initiate data transfer in the CDPD mode. An advantage of remaining in the CDPD mode is that the battery is not heavily burdened so that, based on current battery technology, talk time at full transmission power is greater than 1 hour and standby time while monitoring the AMPS control channel is greater than 12 hours.

Sleep mode procedures are used to place the handset in the sleep mode, which is defined as an optional mode of operation that might be requested by a wireless subscriber station M-ES during a data link establishment procedure (communication between the wireless subscriber station and mobile data intermediate system). The sleep mode is intended to assist power conservation strategies in the wireless subscriber station. The general operation of the sleep mode permits an M-ES to disable or power-down its receiver and associated circuitry. This mode is a key advantage of CDPD operation.

The sleep mode procedure operates in the "multiple frame established state". In this operation, if no frames are exchanged on the data link connection between a particular wireless subscriber station M-ES and the MDBS after a period of time defined by the parameter T203, the data link connection may be placed in the Temporary Equipment Identifier (TEI) sleep state for the handset. While in this state, the overall network will not attempt to transmit information destined for that M-ES. If, after entering the sleep state, new frames become extant and waiting initial transmission, the network will broadcast a predetermined message at periodic intervals. This message contains a list of TEI's for which channel data are pending. The wireless subscriber stations are expected to wake up at periodic intervals to determine if data from them are pending, and notify the network that they are willing to receive the pending data. Normally, the M-ES may exit the sleep state at any time.

Parameter T203 represents the maximum time allowed without frames being exchanged on the data link connection before the M-ES is expected to enter the CDPD sleep mode. On the user/subscriber (M-ES) side, timing of the parameter T203 is started or restarted upon transmission of a data link layer frame of any type on the reverse channel (from the M-ES to the MDBS). On the network side, the timing of parameter T203 for a particular M-ES is started or restarted upon receipt of a data link layer frame (of any type) on the CDPD channel. If the value of parameter T203 expires, the data link entity will enter the TEI sleep state, and issue an indication of this state from the user's side. The layer management entity may take power conserving measures, such as disabling the subscriber radio receiver or other non-essential portions of its circuitry.

A second parameter, T204, represents the time intervals at which the network side broadcasts TEI notification of pending data for a sleeping M-ES. A single timing operation for parameter T204 is maintained for a channel stream; all user side management entities discover and synchronize to particular channel streams T204, via the TEI notification procedure described in Section 6.8.8 of Part 403 of the CDPD specification. The number of frames queued in the maximum time for which the network attempts to notify an M-ES in the TEI sleep state is implementation dependent. The network releases a data link connection and discards all queued frames for which the TEI sleep notification procedures are aborted. The maximum number of attempts to notify an M-ES in the TEI sleep state of pending network transmissions is designated system parameter N204. The network normally aborts a TEI sleep notification procedure for a TEI which has been included in a number expressed as parameter N204, of successive TEI notification messages without a response from that M-ES. Consequently, M-ES will be deregistered with the CDPD system.

A complete description of the aforementioned operation is found in Section 6.8 of Part 403 of the CDPD specification. The parallel operation of M-ES and the MD-IS is depicted in the flow charts of FIG. 5. Both units recognize when the last CDPD communication by a particular subscriber at an M-ES has taken place. In this respect, both the M-ES and the MD-IS can be synchronized to each other. Using internal clocks, both units keep track of the time elapsed since elapse of the most recent CDPD communication between the M-ES and the MD-IS, as indicated at step 702. Thus, in operation according to this Part of the CDPD specification, if no data is sent in either direction over the air link for a certain length of time (parameter T203), the M-ES will go into the sleep mode and the network will assume that the M-ES is asleep, as indicated at step 703. Once the M-ES enters the sleep mode another timing operation is carried out in both the M-ES and the MD-IS.

The total length of this period is defined by the product of parameters T204 and N204, previously described. If the network has data to deliver to the M-ES that is believed to be asleep, the network will add the TEI for that M-ES to a list of sleeping units on a particular channel stream, that have data waiting for them. However, the network will not send that data (step 704). For each time frame measured by the parameter T204, the network will send a TEI indication for a particular wireless subscriber station M-ES indicating that there is data waiting for that wireless subscriber station. Thus, the wireless subscriber station will have to be monitoring the CDPD channel at some time during the time frame defined by T204 in order to determine if a message is waiting for that wireless subscriber station.

The list of wireless subscriber stations having waiting messages is broadcast to all stations on that channel stream periodically in a TEI notification message. The time between such notification is specified by the parameter T204. This parameter determines the length of time the M-ES is expected to sleep before waking for its messages. When the M-ES awakens, it waits until it receives a notification message. If the TEI of that M-ES is on the list, it notifies the network that it is ready to receive data. If the TEI of a particular M-ES is not on that list, that M-ES goes back to sleep for another period of time, normally specified by the parameter T204. If a consecutive number of notifications (specified by the parameter N204) have been made for a TEI without the subject M-ES indicating that it is ready to receive data, the network will then assume that the M-ES is no longer present on the CDPD system and discards the data that was pending for that M-ES, as indicated at step 705.

If the particular M-ES is handling normal AMPS communication for a greater amount of time than that encompassed by the product of parameters N204 and T204, then the data being held for that M-ES is discarded by the network. Thus, CDPD communication is lost due to the normal operation of AMPS communication. Thus, it is necessary that the subscriber station M-ES remain tune to the CDPD channel long enough to monitor for its TEI. This entails additional time in the awake state, and as a result, additional battery drain.

Since AMPS mode operation is recognized as having preference over CDPD mode operation, the handset preferably spends most of its time monitoring for AMPS communication and just enough time in the CDPD mode to pick up indication of messages for a wireless subscriber station and avoid de-registration. One mode of operating a wireless subscriber station M-ES involves remaining in the AMPS mode monitoring an AMPS control channel while periodically breaking away to poll the CDPD network. When breaking away from the AMPS mode, the wireless subscriber station M-ES sends a polling signal to the CDPD network to evoke a response and determine if there is any data waiting on the CDPD network for transmission to that wireless subscriber station. After listening for an appropriate amount of time (usually T203) after the response for a return message from the CDPD network, the wireless subscriber station then switches modes and tunes back to the AMPS channel. Preferably this switch-over occurs before any re-transmission of relevant AMPS pages that might have been missed while the wireless subscriber station was in the CDPD mode.

Improved efficiency in CDPD systems has resulted in the TEI messages being grouped in a very short period of time so that responses from a substantial number of subscriber stations automatically take place substantially within that abbreviated period of time, as described in pending U.S. patent application Ser. No. 08/533,152, entitled "Method and Apparatus for Controlling Wireless Subscriber Stations Subject to Power Consumption Constraints in Mobile Packet Data Communication System", filed Sep. 25, 1995, and pending U.S. patent application Ser. No. 08/534,855, entitled "Temporary Equipment Identifier Message Notification Method", filed Sep. 27, 1995, incorporated herein by reference as background material. The result of this increased efficiency is that substantial numbers of subscriber stations are notified of pending data within a brief amount of time, and all will attempt to gain access to the shared channel at substantially the same time causing collisions. This situation also occurs in normal analog voice cellular operation. However, the problem is not nearly as pronounced since the aforementioned improvements in CDPD operation have not been applied to analog cellular operation.

Two types of collision situations exist. The first situation occurs when a subscriber station attempts to gain access to a channel that an indication from the MDBS that that particular channel is already in use. Collision does not occur at this point. However, if the subscriber station continues to check the state of the subject channel continuously until that channel becomes idle, then the problem of collision does exist. A high probability of collision is caused by the fact that more than one subscriber can be going through the same routine for accessing the same channel.

In the second situation, the collision has already occurred and has been detected by one of the subscriber stations involved in the collision. At the point that detection is made, at least one of the subscribers releases the channel if it still has access thereto, and then waits. Normally, the subscriber station will continue to attempt to access the subject channel, further increasing the chance of collision.

As a result of these two conditions, there may be constant racing between competing subscriber stations trying to access a limited number of channels after receiving a large number of TEI messages in a short period of time. This will severely hinder channel allocation as well as making channel accessing for numerous subscriber stations very difficult and time consuming. In effect, the collision phenomena could very well undo the benefits previously described with respect to predicting the occurrence of TEI message transmissions.

BRIEF SUMMARY OF THE INVENTION

A first advantage of the present invention is to avoid various types of collisions between subscriber stations seeking the same channels.

Another advantage of the present invention is increased efficiency in channel allocation among subscriber stations.

A further advantage of the present invention is to allow virtually 100% of reverse channel utilization.

Still another advantage of the present invention is in decreased power expenditure and increased battery life due to less time and energy spent in futile attempts to access occupied channels.

These and other advantages of the present invention are achieved by a method of controlling wireless subscriber station responses to Temporary Equipment Identifier (TEI) messages in a wireless communication system. The wireless communication system has at least one base station for controlling a communication stream broadcast to the wireless subscriber stations. The method includes the steps of dividing the communication stream into a plurality of segments and dividing the segments into a plurality of blocks. All pending TEI messages for a base station are placed in a first block in each segment in a predetermined order for transmission by the base station on a forward channel. The reverse channel is segmented so that a block is assigned to each TEI message transmitted on the forward channel so that each subscriber station receiving an associated TEI message responds only in the block assigned for that corresponding TEI message.

Another aspect of the invention is found in a method of controlling wireless subscriber station responses to TEI messages in a wireless communication system having at least one base station for controlling a communication stream broadcast to the wireless subscriber stations. The method includes the steps of dividing the communication stream into a plurality of segments, and dividing the segments into a plurality of blocks. All pending TEI messages for a base station are placed in a first block in each of the segments in a predetermined order for transmission by the base station on a forward channel. A block on a reverse channel is assigned to each TEI message transmitted on the forward channel for response by each subscriber station associated with each of those TEI messages. As a result, each of the blocks on the reverse channel begins after a time delay starting from the TEI messages on the forward channel, where the time delay comprises a random number and a number of TEI messages broadcast on the forward channel.

DETAILED DESCRIPTION OF PREFERRED EMBODIMENT

Figure 6:
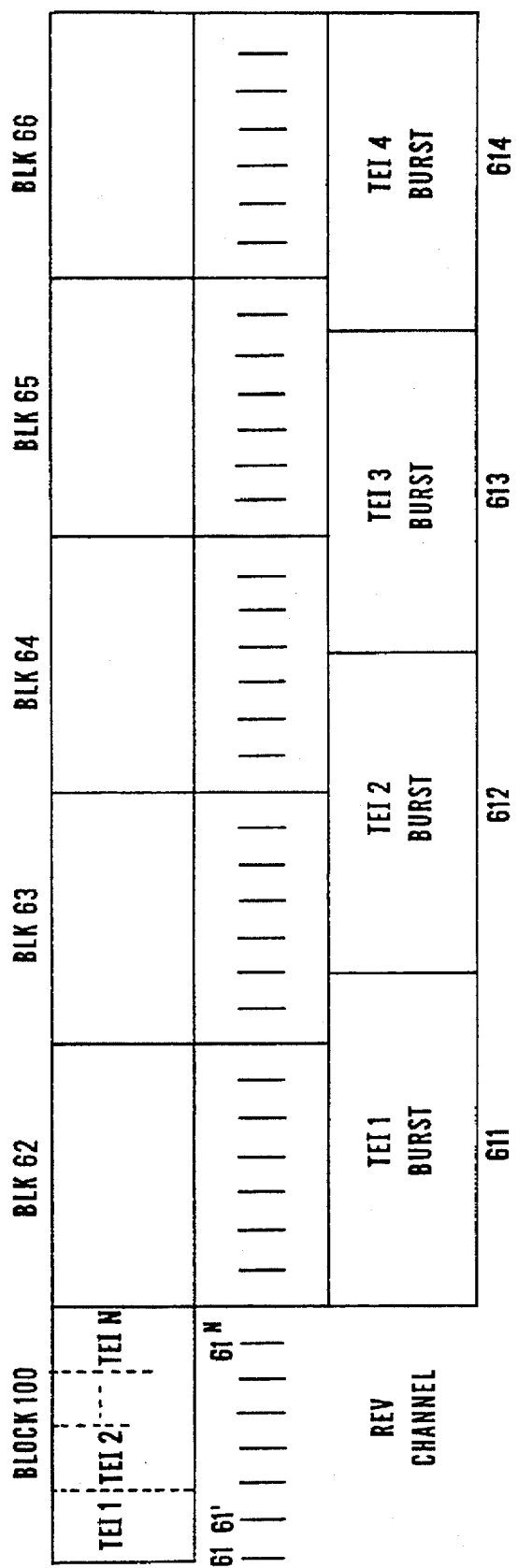
FIG. 6 is a diagram depicting the message block arrangement of the invention.

FIG. 6 is a time flow diagram depicting an arrangement of message blocks on both the forward and reverse channels. On the forward channel (from the MDBS to the subscriber stations) the message flow is divided into blocks 60, 62, 63, 64, 65, 66 . . . . The TEI notification messages are contained in the first block 60, and are arranged in order of their receipt by the MDBS. These TEI messages are arranged in sequence and designated 61, 61', 61"... 61$^N$. The arrangement of all the TEI messages as depicted in FIG. 6 is described in pending U.S. patent application Ser. No. 08/533,152, "Method and Apparatus for Controlling Wireless Subscriber Stations Subject to Power Consumption Constraints in Mobile Packet Data Communication System, filed Sep. 25, 1995, previously incorporated by reference as background material. The arrangement of the TEI messages is not the subject of the present invention. Rather, it is the response on the reverse channel of the subscriber stations that constitutes the present invention and the solution to the problems caused by the arrangement of the TEI messages.

The reverse channel containing bursts 611, 612, 613, 614 ... is completely utilized until all of the subscriber stations responding to the TEI messages have sent their bursts. The arrangement of the subscribers is the same as that in block 60 so that the subscriber stations are compelled to respond in predetermined order with each subscriber transmitting only a single FEC burst as illustrated in FIG. 6. As a result, there is no competition or the resulting collisions between subscriber stations attempting to access the reverse channel to reply to the TEI notification.

The precise sequence and timing of the channel burst messages 611, 612, 613 ... is achieved by using a reference point based upon the completion of the TEI messages (block 60) on the forward channel. The reference point is preferably chosen as one microslot (one-seventh of a block) after the end of the TEI message. Each of the responding subscriber stations associated with a TEI message responds after a time delay of nine microslots times the position of corresponding TEI message in the forward channel block 60. This time delay takes place immediately after the reference point. It is noted that while preferably the reference point is one microslot after the end of the TEI messages in block 60, it can be arranged to be virtually any number of microslots.

Figure 7:
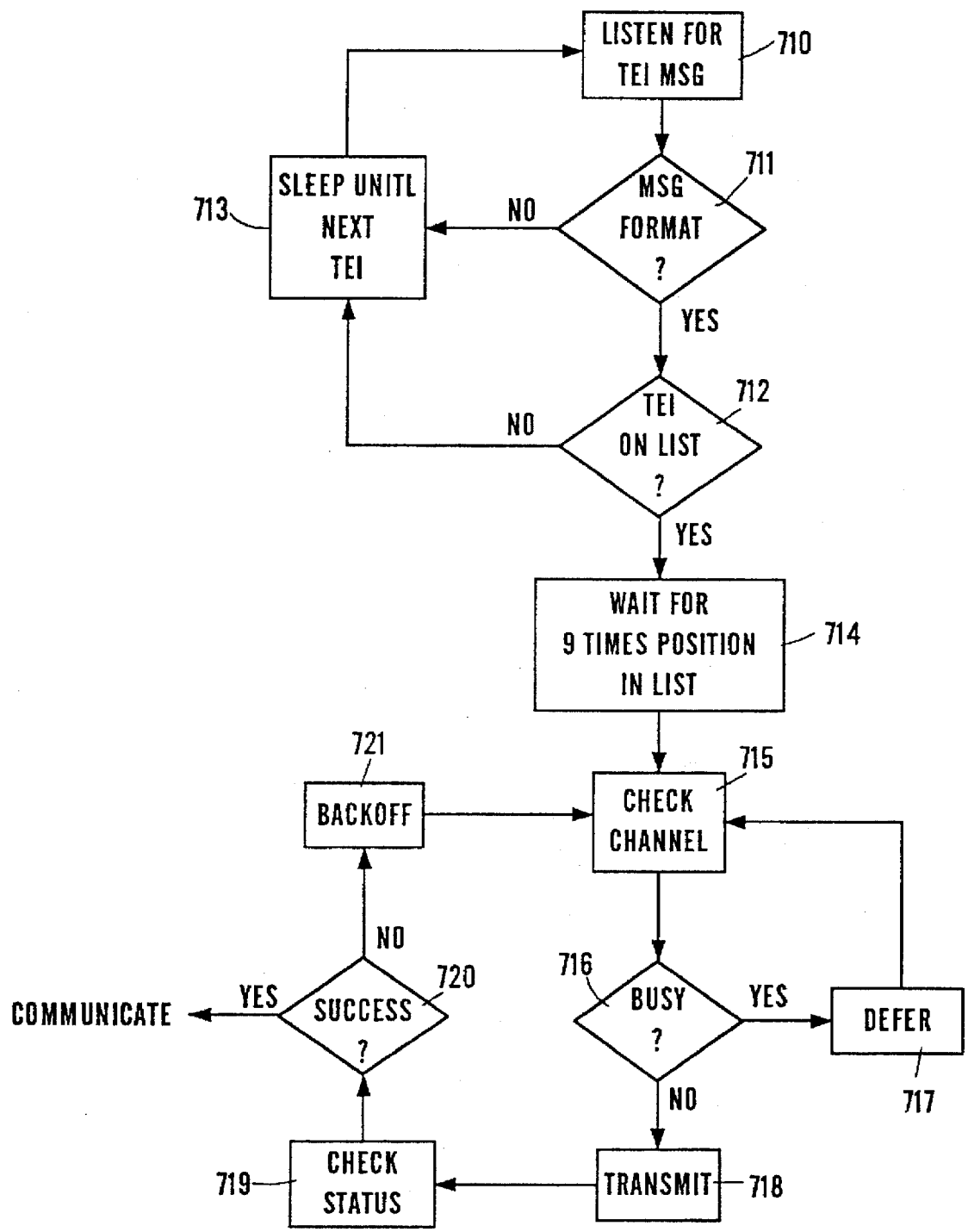
FIG. 7 is a flow diagram depicting the sequence of operation of a system using the data arrangement of FIG. 6.

In an alternative approach as depicted in the flow chart of FIG. 7, all of the awakening subscriber stations would be forced to enter into a defer mode. In this mode, the attempts to access the reverse channel for answering burst 611, 612, 613, 614 ... are randomized. Thus, the access time for each subscriber station meaning to send a burst on the reverse channel would be defined by some factor between 0 and 9 times the number of TEIs in the entire notification message (in units of time defined by the length of a microslot which is one-seventh of a block) multiplied by a randomly chosen number (0–54). The time can also be greater than this value.

Figure 1:
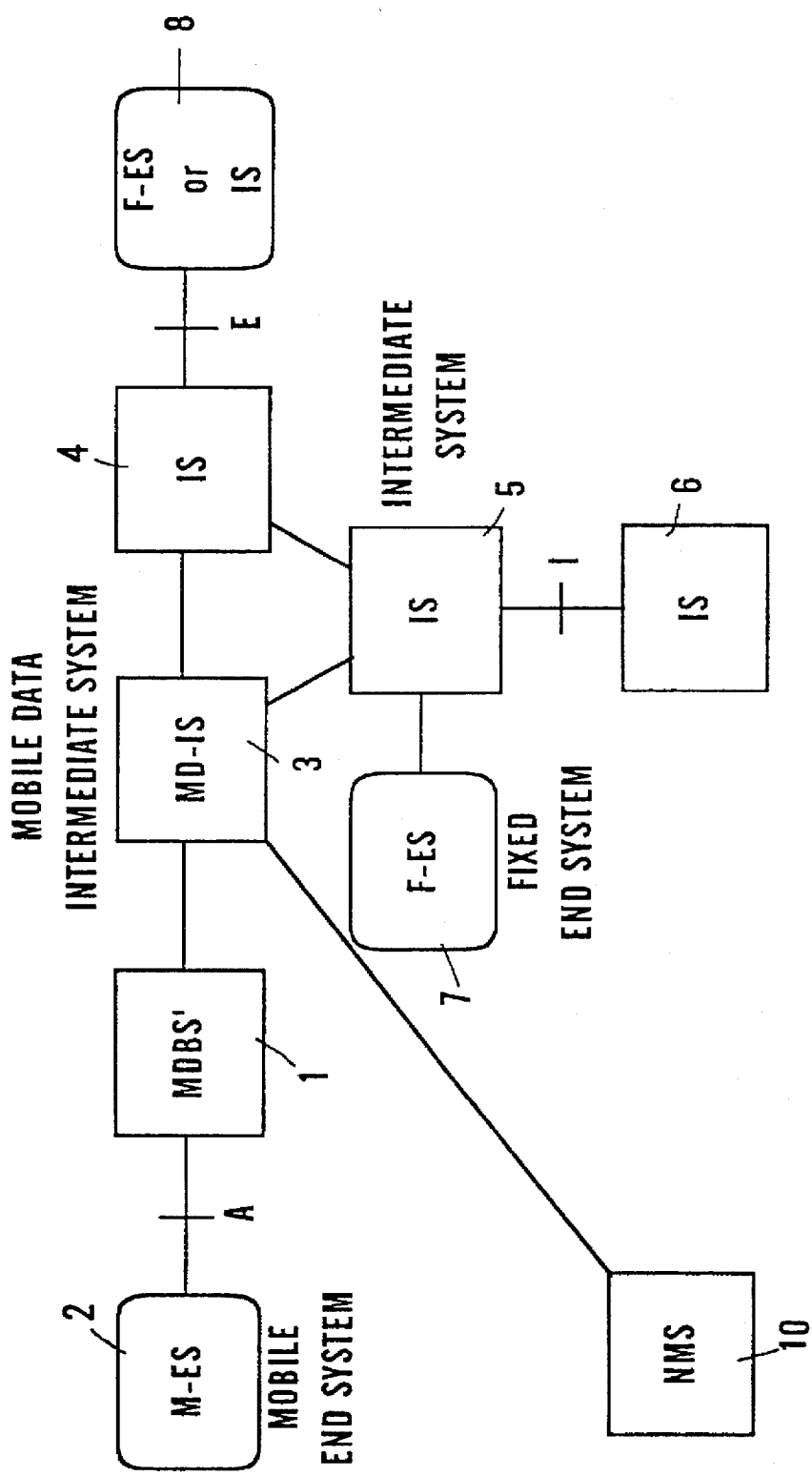
FIG. 1 is a block diagram of a conventional CDPD system.
Figure 2:
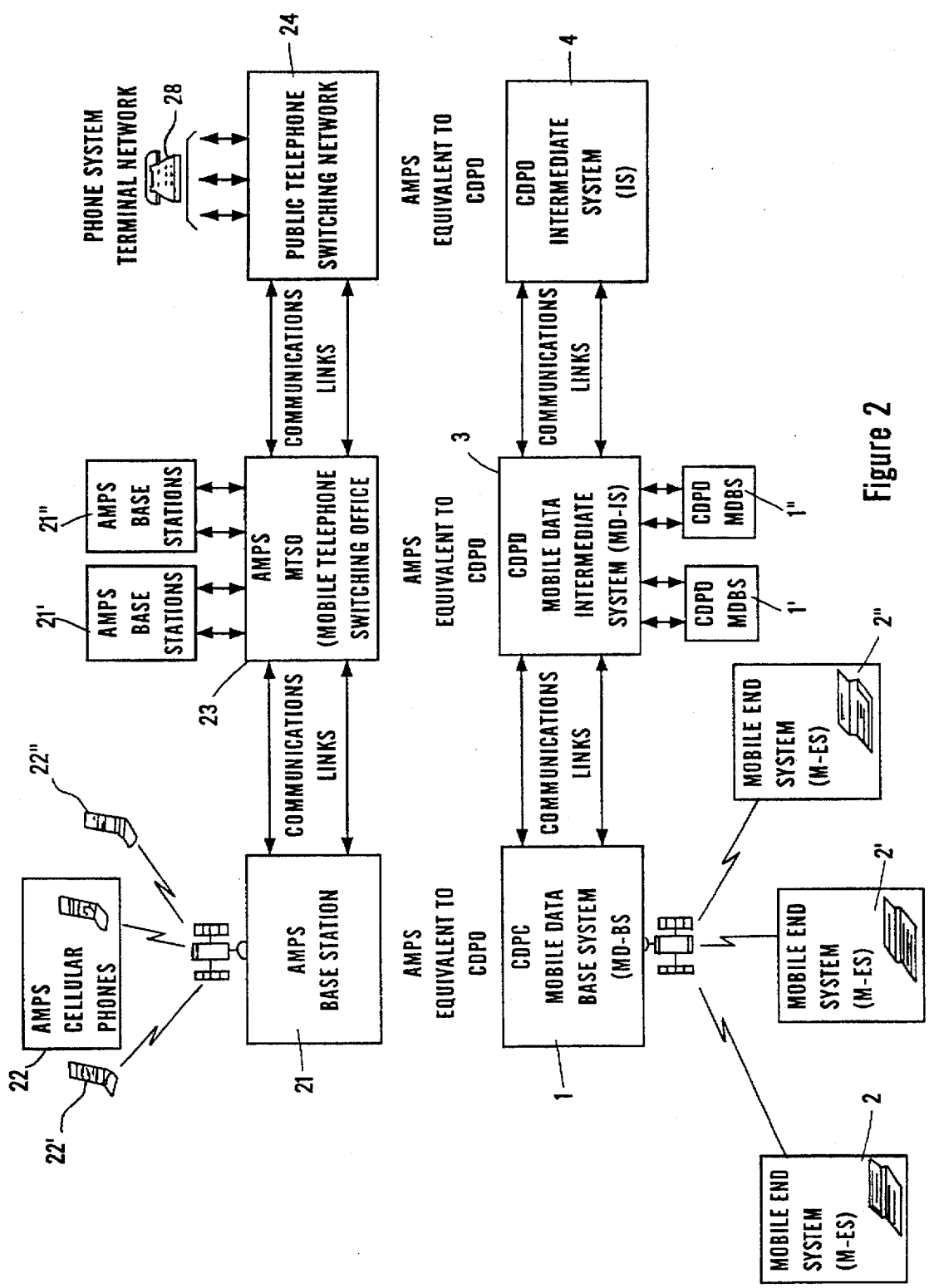
FIG. 2 is a block diagram correlating the CDPD system to a conventional AMPS system.
Figure 3:
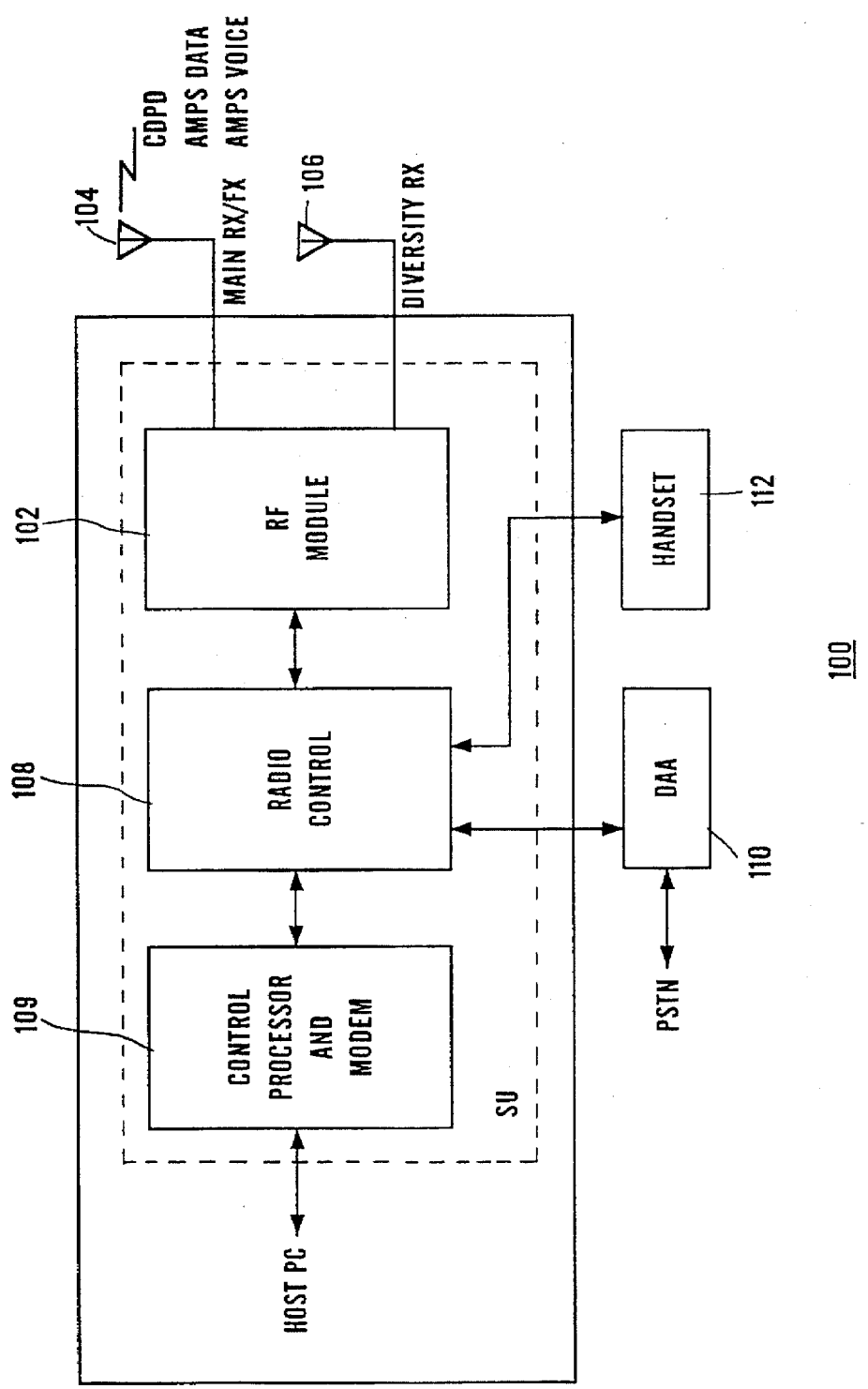
FIG. 3 is a block diagram of a portable radio telephone handset.
Figure 4:
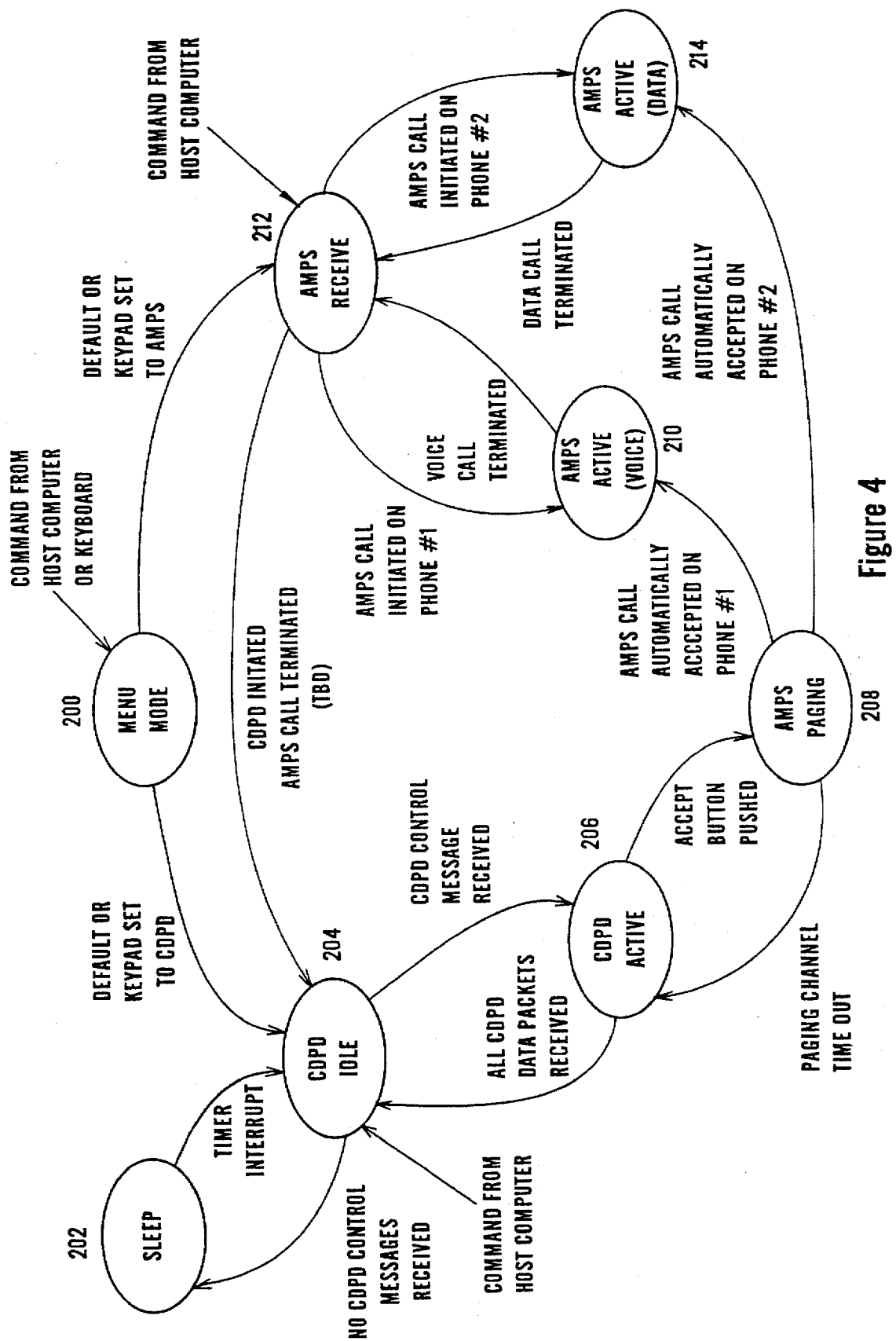
FIG. 4 is a block diagram of MDBS architecture.
Figure 5:
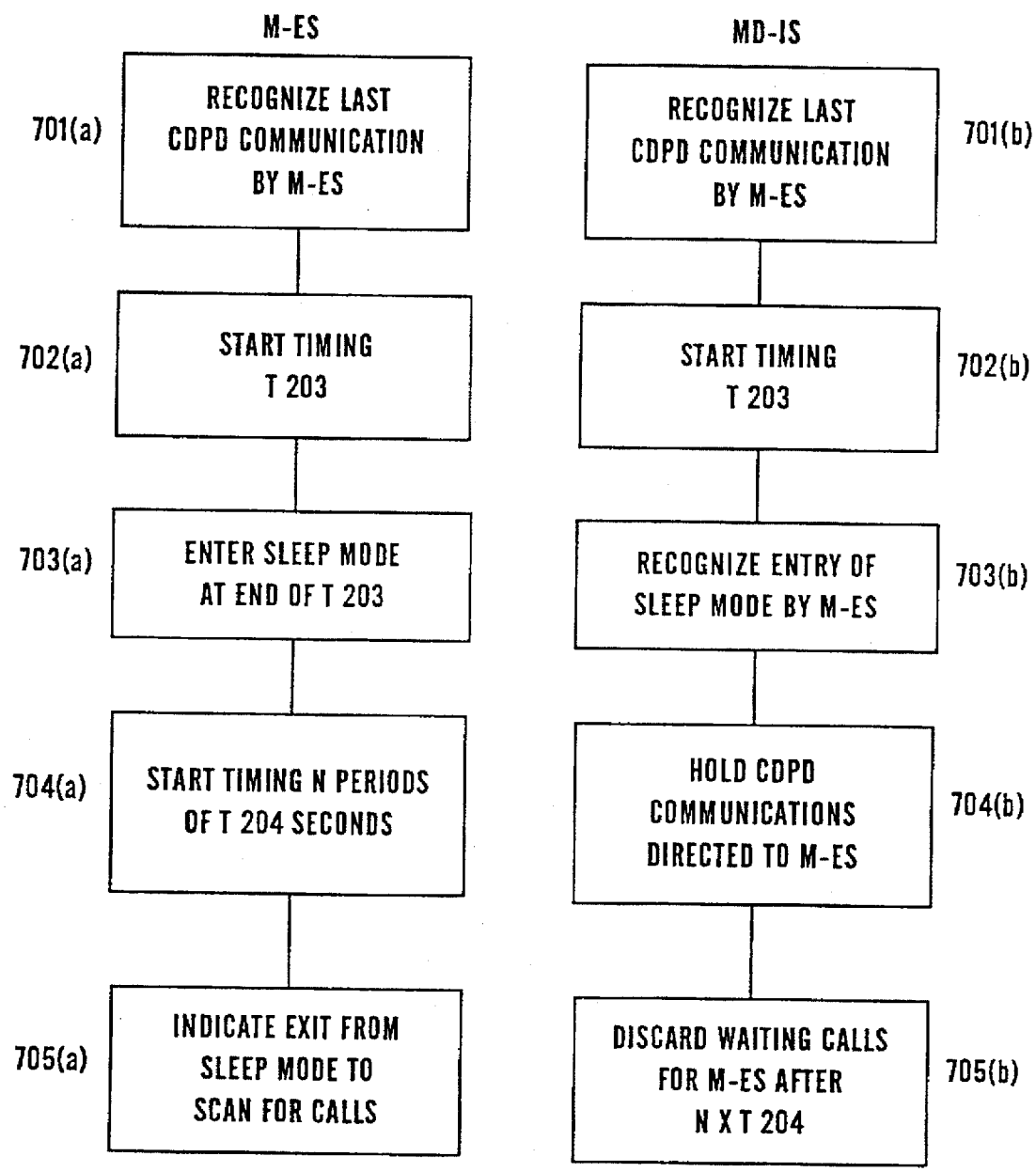
FIG. 5 is a flow chart depicting parallel operation between wireless subscriber station and an associated MD-IS.

The comprehensive operation of a subscriber station (such as that depicted in FIG. 3) in accordance with the present invention is depicted in FIG. 7. At step 710, the handset is in the awake mode and monitoring for the appropriate TEI message. The subscriber station could have entered the awake mode in any number of ways and could have remained in the awake mode for any amount of time depending upon the system in which the subscriber station is operated. This disposition is not part of the present invention.

In the normal course of monitoring for a corresponding TEI message, the subscriber station will determine at step 711 if a block of TEI messages such as that depicted at 60 in FIG. 6 has been identified. If after a predetermined amount of time, messages are not found, the subscriber station can re-enter the sleep mode as depicted at step 713. It is noted that re-entry into the sleep mode is the preferred embodiment for the present invention since the object of the present invention is to minimize energy expenditure and thus prolong battery life. However, the subscriber station can remain in the awake mode until the next transmission of TEI messages occurs. In the alternative, the subscriber station can remain in the awake state and switch frequencies to monitor an AMPS channel. However, both of these second activities expend additional energy and lessen battery life.

If the TEI message block 60 has been found, the subscriber station must identify if a TEI message corresponding to that subscriber station is being broadcast at step 712. If not, the subscriber station will preferably re-enter the sleep mode until a timing operation or some other mechanism brings it to the awake mode to listen for a corresponding TEI message at a later time. As stated above, it is not necessary that the subscriber station return to the sleep mode. However, this is considered preferable for reasons stated above.

If a TEI message corresponding to the subscriber station is on the list, a random time operation is carried out at step 714. A time delay is imposed on the subscriber station before attempting to access the reverse channel with the appropriate single FEC block burst (611, 612, etc.). The time delay will be between 0, and 9 times the number of TEI messages arranged in block 60 (in time units based upon the size of a microslot which is one-seventh of a block). However, the delay time can be greater than this value.

At step 715, the subscriber station checks the reverse channel for the purpose of accessing that channel. At step 716, the subscriber station determines if the reverse channel is busy. If the channel is busy, the subscriber station will go through a defer step at 717, incorporating a predetermined time delay. The time spent is determined as a random period of time between zero and some predetermined maximum units of time. In the preferred embodiment, that unit of time is defined by the time required for one microslot such as those constituting block 60. When this time has expired, the subscriber station will check the channel once again for purposes of accessing it. If the channel appears to be busy during a repeat of step 716, the second defer step 717 will select another random time within the aforementioned limits.

If the reverse channel is not busy, the subscriber station will transmit an appropriate FEC burst in response to the TEI message. This burst is designed to acquire a reverse channel for purposes of carrying out communication. At step 719, the subscriber station checks to determine if it has acquired the reverse channel necessary for communication. If success is determine at step 720, the communication sought by the subscriber station has begun.

If, on the other hand, a collision on the desired channel has already occurred, the subscriber station enters the back-off phase at step 721. At that point, the subscriber station will release the channel if it still has access to it, and wait a random amount of time. This time is defined as a value between 0 and a predetermined initial upper limit. After that time, the subscriber station will once again check the channel at step 715 and carry out the same series of steps from steps 716 through 720. If the subscriber station is sent into the back-off mode once again, a second random time between zero and two times the predetermined initial maximum is selected. If the subscriber station is forced to go through the same series of steps a third time, the initial upper limit is doubled a second time. This doubling continues until a predetermined final maximum is reached for the upper limit.

Although a number of arrangements of the present invention have been mentioned by way of example, it is not intended that the invention be limited thereto. For example, the present invention can be adapted to accommodate other types of communications systems. Accordingly, this invention should be considered and include any and all configurations, modifications, variations, combinations or equivalent arrangements falling within the scope of the following claims.

We claim:

1. A method of controlling wireless subscriber station responses to Temporary Equipment Identifier (TEI) messages in a wireless communication system having at least one base station for controlling a communication stream broadcast to said wireless subscriber stations, said method comprising the steps of:

(a) dividing said communication stream into a plurality of segments;

(b) dividing said segments into a plurality of blocks;

(c) placing all pending TEI messages for a base station in a first block in each said segment in a predetermined order for transmission by said base station on a forward channel; and (d) assigning on a reverse channel a block corresponding to each said TEI message transmitted on said forward channel, whereby each subscriber station receiving an associated TEI message responds only in said block assigned for said corresponding TEI message.

2. A method of controlling wireless subscriber station responses to Temporary Equipment Identifier (TEI) messages in a wireless communication system having at least one base station for controlling a communication stream broadcast to said wireless subscriber stations, said method comprising the steps of:

(a) dividing said communication stream into a plurality of segments;

(b) dividing said segments into a plurality of blocks;

(c) placing all pending TEI messages for a base station in a first block in each said segment in a predetermined order for transmission by said base station on a forward channel; and (d) assigning a block on a reverse channel corresponding to each TEI message transmitted on said forward channel for response by each subscriber station associated with each said TEI message, wherein each said block on said reverse channel begins after a time delay starting from said TEI messages on said forward channel, where the time delay comprise a random number and a number of TEI messages broadcast on said forward channel.

* * * * *